US008955349B2

(12) United States Patent
Mitchell et al.

(10) Patent No.: US 8,955,349 B2
(45) Date of Patent: Feb. 17, 2015

(54) WATER FILTER ASSEMBLY (75) Inventors: Alan Joseph Mitchell, Louisville, KY (US); Andrew Reinhard Krause, LaGrange, KY (US)

(73) Assignee: General Electric Company, Schenectady, NY (US)

( * ) Notice: Subject to any disclaimer, the term of this patent is extended or adjusted under 35 U.S.C. 154(b) by 328 days.

(21) Appl. No.: 13/103,342

(22) Filed: May 9, 2011

(65) Prior Publication Data
US 2012/0285192 A1 Nov. 15, 2012

(51) Int. Cl.
*F25D 3/02* (2006.01)
*B01D 27/00* (2006.01)
*B01D 35/02* (2006.01)
*B01D 35/30* (2006.01)
*C02F 1/00* (2006.01)
*F25D 23/12* (2006.01)

(52) U.S. Cl.
CPC ............. *B01D 27/00* (2013.01); *B01D 35/02* (2013.01); *B01D 35/30* (2013.01); *C02F 1/003* (2013.01); *F25D 23/12* (2013.01); *B01D 2201/302* (2013.01); *B01D 2201/4023* (2013.01); *C02F 2307/12* (2013.01)
USPC ................... 62/318; 62/317; 62/389

(58) Field of Classification Search
CPC .......... B01D 2201/4023; B01D 35/30; B01D 27/00; B01D 35/02; C02F 1/003; F25D 23/12
USPC ......... 62/318, 317, 331, 389; 210/235, 323.1, 210/234, 435, 95, 450, 470, 282, 348, 232, 210/236, 249, 440, 444
See application file for complete search history.

(56) References Cited

U.S. PATENT DOCUMENTS

| 4,806,240 | A | * | 2/1989 | Giordano et al. ............. 210/232 |
|---|---|---|---|---|
| 5,762,787 | A | * | 6/1998 | Park et al. ..................... 210/232 |
| 7,056,435 | B2 | | 6/2006 | Jenkins et al. |
| 7,491,327 | B2 | | 2/2009 | Jenkins, Jr. et al. |
| 8,097,158 | B2 | * | 1/2012 | Tubby et al. .................. 210/235 |
| 2008/0011008 | A1 | | 1/2008 | Cur et al. |
| 2008/0060982 | A1 | | 3/2008 | Krause et al. |
| 2010/0126202 | A1 | * | 5/2010 | Flores et al. .................... 62/344 |
| 2010/0170841 | A1 | * | 7/2010 | An et al. ........................ 210/234 |
| 2011/0036765 | A1 | | 2/2011 | Kim |
| 2011/0079037 | A1 | | 4/2011 | Snider et al. |
| 2011/0185762 | A1 | * | 8/2011 | Kruckenberg et al. ......... 62/389 |
| 2012/0024003 | A1 | * | 2/2012 | Kim ................................ 62/389 |
| 2012/0144854 | A1 | * | 6/2012 | Huda et al. ..................... 62/318 |

* cited by examiner

*Primary Examiner* — Cheryl J Tyler
*Assistant Examiner* — Ana Vazquez
(74) *Attorney, Agent, or Firm* — Dority & Manning P.A.

(57) ABSTRACT

In certain embodiments of the present disclosure, a water filter assembly for a refrigerator is described. The water filter assembly includes a door that includes a mover element for engaging a removable water filter such that in the closed position the mover element holds the removable water filter water inlet and water outlet in fluid communication with the water inlet and water outlet, respectively, of a manifold assembly, and in the open position the mover element allows for removal of the removable water filter which is not in fluid communication with the manifold assembly.

13 Claims, 9 Drawing Sheets

WATER FILTER ASSEMBLY

FIELD OF THE INVENTION

The present disclosure relates to a water filter assembly.

BACKGROUND OF THE INVENTION

Refrigerators may include a water dispensing system having a water storage tank for storing and cooling water to be dispensed. Further, some water dispensing systems include a water filter assembly that includes a removable filter which can be periodically replaced. The removable filter is typically located in a fresh food compartment of the refrigerator.

The location of the removable filter can take away usable space from the fresh food compartment. Any space consumed by the removable filter and/or water filter assembly ultimately results in less usable storage space to the consumer. In addition, conventional removable filters are typically difficult to reach and replace.

Accordingly, a water filter assembly that can occupy less space in the fresh food compartment while enabling the removable filter to be changed easily and efficiently would be desirable. A refrigerator incorporating such a water filter assembly would be particularly useful.

BRIEF DESCRIPTION OF THE INVENTION

Aspects and advantages of the disclosure will be set forth in part in the following description, or may be obvious from the description, or may be learned through practice of the disclosure.

In certain embodiments of the present disclosure, a water filter assembly for a refrigerator is described. The water filter assembly includes a manifold assembly having a water inlet and a water outlet and a removable water filter having a water inlet and a water outlet. The water filter assembly further includes a housing that can receive the removable water filter, the housing having a door that is pivotally joined to the housing and is movable between a closed position and an open position. The door includes a mover element for engaging the removable water filter such that in the closed position the mover element holds the removable water filter water inlet and water outlet in fluid communication with the water inlet and water outlet, respectively, of the manifold assembly, and in the open position the mover element allows for removal of the removable water filter which is not in fluid communication with the manifold assembly.

In still other embodiments of the present disclosure, a water filter for a refrigerator having a manifold is described. The water filter includes filter media and a cylindrical body for housing the filter media. The body comprises a neck configured for fluid communication with the manifold, wherein the neck comprises a top portion and a side portion. The top portion of the neck defines a top opening to an inlet fluid path and the side portion defines a side opening to an outlet fluid path. The inlet fluid path is in fluid communication with the outlet fluid path and the inlet fluid path and outlet fluid path are in fluid communication with the filter media.

In yet other embodiments of the present disclosure, a refrigerator is described. The refrigerator includes a water filter assembly having a manifold assembly with a water inlet in flow communication with a water supply line and a water outlet in flow communication with a water dispenser. The water filter assembly has a removable water filter having a water inlet and a water outlet. The water filter assembly further includes a housing that can receive the removable water filter, the housing having a door that is pivotally joined to the housing and is movable between a closed position and an open position. The door includes a mover element for engaging the removable water filter such that in the closed position the mover element holds the removable water filter water inlet and water outlet in fluid communication with the water inlet and water outlet, respectively, of the manifold assembly, and in the open position the mover element allows for removal of the removable water filter which is not in fluid communication with the manifold assembly.

These and other features, aspects and advantages of the present disclosure will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure, including the best mode thereof, directed to one of ordinary skill in the art, is set forth in the specification, which makes reference to the appended figures, in which.

DETAILED DESCRIPTION OF THE INVENTION

The present disclosure relates to a water filter assembly, particularly a water filter assembly for a refrigerator. Utilization of such a water filter assembly can occupy less space in the fresh food compartment of a refrigerator while enabling the removable filter to be changed easily and efficiently. Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
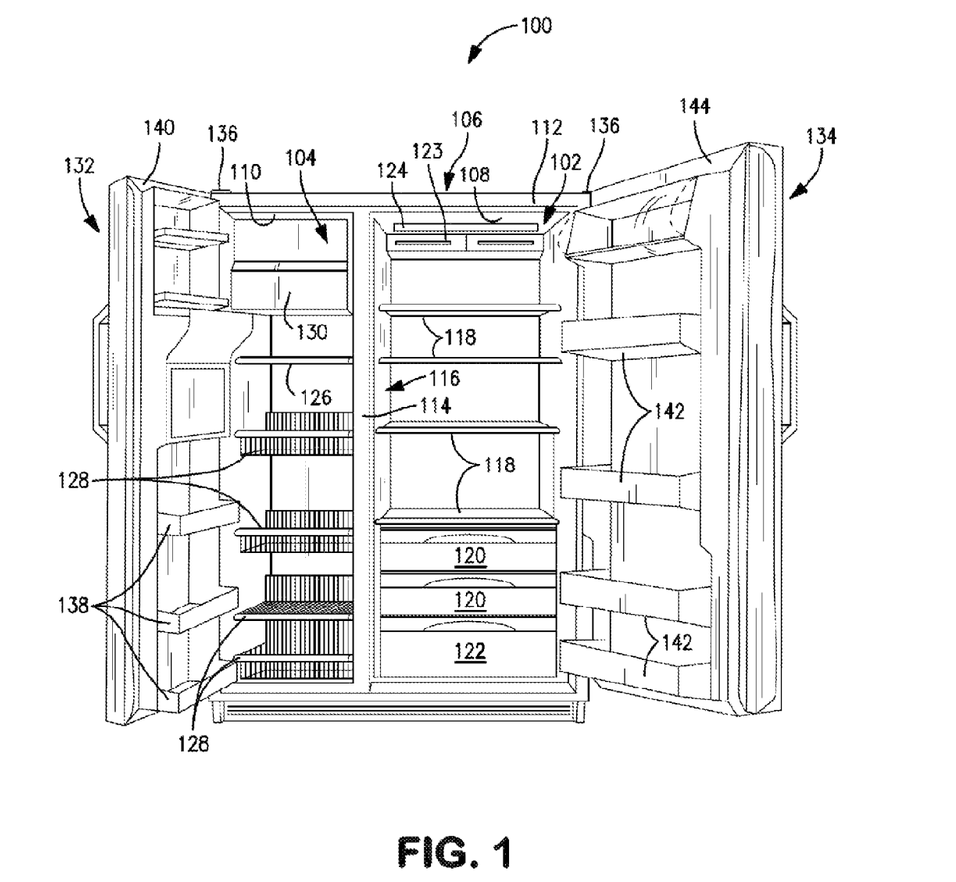
FIG. 1 provides a perspective view of an example refrigerator in accordance with certain aspects of the present disclosure.

FIG. 1 is a perspective view of an exemplary refrigerator 100 in which exemplary embodiments of the present invention may be practiced and for which the benefits of the invention may be realized. It is apparent to those skilled in the art and guided by the teachings herein provided that the apparatus and/or method, as described herein, may likewise be practiced in any suitable refrigerator. Therefore, refrigerator 100 as described and illustrated herein is for illustrative purposes only and is not intended to limit the herein described apparatus and/or method in any aspect.

FIG. 1 illustrates a side-by-side refrigerator 100 including a fresh food storage compartment 102 and a freezer storage compartment 104. Fresh food compartment 102 and freezer compartment 104 are arranged side-by-side. In one embodiment, refrigerator 100 is a commercially available refrigerator from General Electric Company, Appliance Park, Louisville, Ky. 40225, and is modified to incorporate the herein described apparatus. It is apparent to those skilled in the art and guided by the teachings herein provided that the present invention is suitable for incorporation into other types of refrigeration appliances including, without limitation top and bottom mount refrigerators.

Fresh food storage compartment 102 and freezer storage compartment 104 are contained within an outer case 106 having inner liners 108 and 110. A space between outer case 106 and inner liners 108 and 110, and between liners 108 and 110, is filled with foamed-in-place insulation. In one embodiment, outer case 106 is formed by folding a sheet of a suitable material, such as pre-painted steel, into an inverted U-shape to form a top wall and side walls of outer case 106. In this embodiment, outer case 106 is formed separately and coupled to the side walls and a bottom frame that provides support for refrigerator 100. Inner liners 108 and 110 are molded from a suitable plastic material to form fresh food compartment 102 and freezer compartment 104, respectively. In an alternative embodiment, inner liners 108 and/or 110 are formed by bending and welding a sheet of a suitable metal, such as steel. The illustrative embodiment includes two separate inner liners 108 and 110, as refrigerator 100 is a relatively large capacity unit and separate liners add strength and are easier to maintain within manufacturing tolerances. In smaller refrigerators, a single liner is formed and a mullion spans between opposite sides of the liner to divide it into a freezer compartment and a fresh food compartment.

A breaker strip 112 extends between a case front flange and outer front edges of inner liners 108 and 110. Breaker strip 112 is formed from a suitable resilient material, such as an extruded acrylo-butadiene-styrene based material (commonly referred to as ABS).

The insulation in the space between inner liners 108 and 110 is covered by another strip of suitable resilient material, commonly referred to as a mullion 114. In this embodiment, mullion 114 is formed of an extruded ABS material. Breaker strip 112 and mullion 114 form a front face, and extend completely around inner peripheral edges of outer case 106 and vertically between inner liners 108 and 110. Mullion 114, the insulation between compartments, and a spaced wall of liners separating the compartments, may be collectively referred to herein as a center mullion wall 116.

Shelves 118 and slide-out drawers 120 normally are provided in fresh food compartment 102 to support items being stored therein. A bottom drawer or pan 122 may partly form a quick chill and thaw system (not shown), which is selectively controlled, together with other refrigerator features, by a controller 123. In one embodiment, controller 123 selectively controls refrigerator features according to user preference via manipulation of a control interface 124 mounted in an upper region of fresh food storage compartment 102 and coupled to controller 123. At least one shelf 126 and/or at least one wire basket 128 are also provided in freezer compartment 104.

Controller 123 is mounted within refrigerator 100 and is programmed to perform functions described herein. As used herein, the term "controller" is not limited to integrated circuits referred to in the art as a microprocessor, but broadly refers to computers, processors, microcontrollers, microcomputers, programmable logic controllers, application specific integrated circuits and/or other programmable circuits, and these terms are used interchangeably herein.

Freezer compartment 104 includes an automatic ice maker 130 including a dispenser 131 provided in freezer door 132 so that ice can be dispensed without opening freezer door 132. In one embodiment, ice maker 130 includes a number of electromechanical elements that manipulate a mold to shape ice as it freezes, a mechanism to remove or release frozen ice from the mold and a primary ice bucket for storage of ice produced in the mold. Periodically, the ice supply is replenished by ice maker 130 as ice is removed from the primary ice bucket. The storage capacity of the primary ice bucket is generally sufficient for normal use of refrigerator 100.

Figure 2:
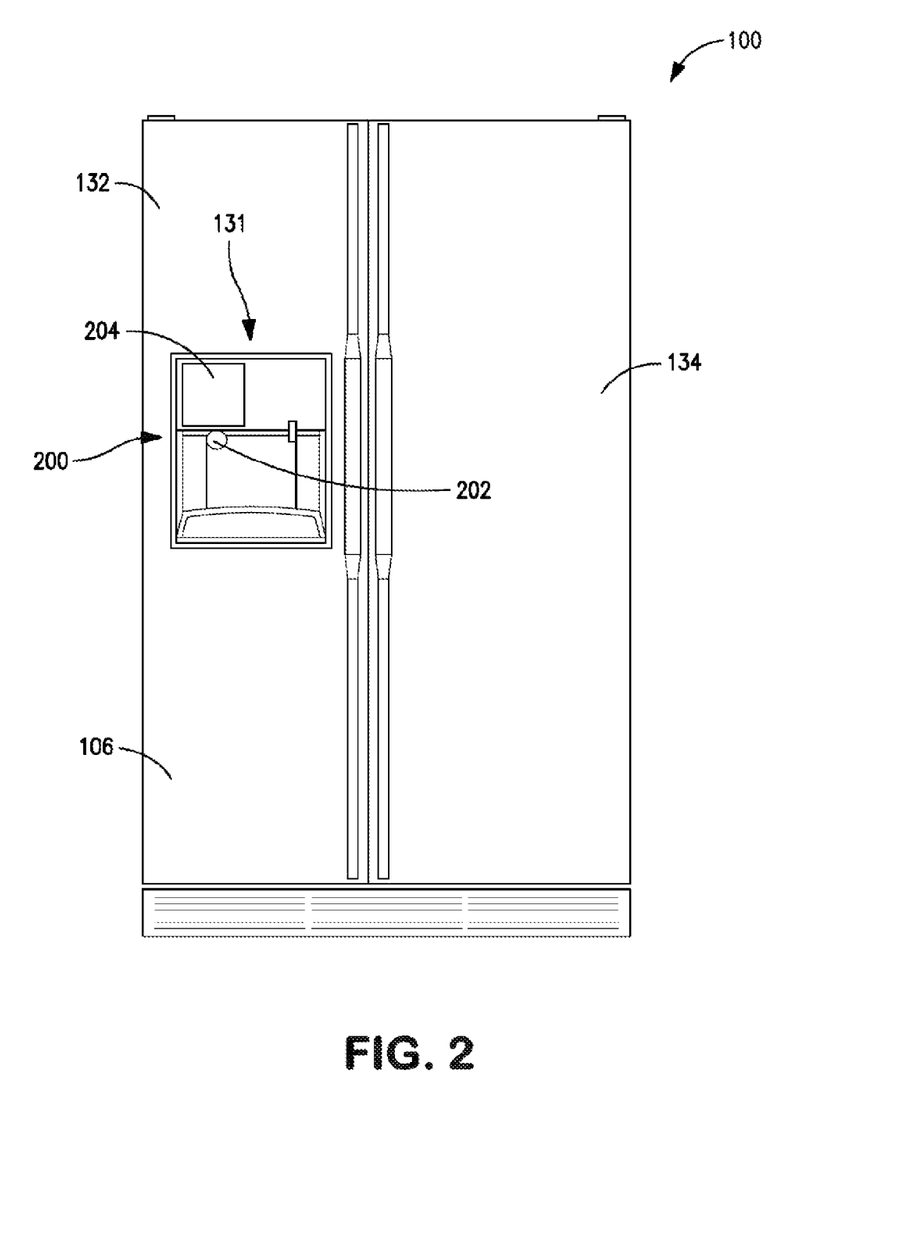
FIG. 2 is a front view of refrigerator shown in FIG. 1 in accordance with certain aspects of the present disclosure.

Freezer door 132 and a fresh food door 134 close openings to freezer compartment 104 and fresh food compartment 102, respectively. Each door 132, 134 is mounted by a top hinge 136 and a cooperating bottom hinge (not shown) to rotate about an outer vertical edge between an open position, as shown in FIG. 1, and a closed position, as shown in FIG. 2. In one embodiment, freezer door 132 includes a plurality of storage shelves 138 and a sealing gasket 140. Similarly, fresh food door 134 includes a plurality of storage shelves 142 and a sealing gasket 144 adjacent to door flange.

Refrigerator 100 includes a machinery compartment (not shown) that at least partially contains components for executing a known vapor compression cycle for cooling air. The components include a compressor, a condenser, an expansion device, and an evaporator connected in series and charged with a refrigerant. The evaporator is a type of heat exchanger that transfers heat from air passing over the evaporator to a refrigerant flowing through the evaporator, thereby causing the refrigerant to vaporize. The cooled air is used to refrigerate one or more refrigerator or freezer compartments via fans (not shown). Collectively, the vapor compression cycle components in a refrigeration circuit, associated fans and associated compartments are referred to herein as a "sealed system." The construction of the sealed system is well known and therefore not described in detail herein. The sealed system is operable to force cold air through the refrigerator.

In one embodiment, a water dispensing system 200 is partially mounted on freezer door 132. In this embodiment, water dispensing system 200 includes a water dispenser 202 extending through freezer door 132 and a user interface 204 mounted on the front face of freezer door 132. It is apparent to those skilled in the art and guided by the teachings herein provided that water dispensing system 200 may be mounted at any suitable location on refrigerator 100.

Figure 3A:
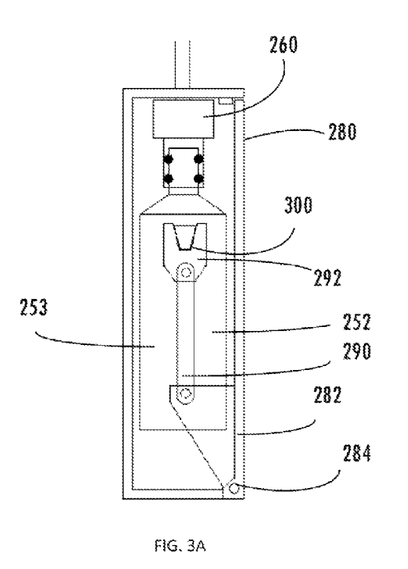
FIG. 3A is a side view of a water filter assembly with a door in the open position for use with the refrigerator shown in FIG. 1 in accordance with certain aspects of the present disclosure.
Figure 3B:
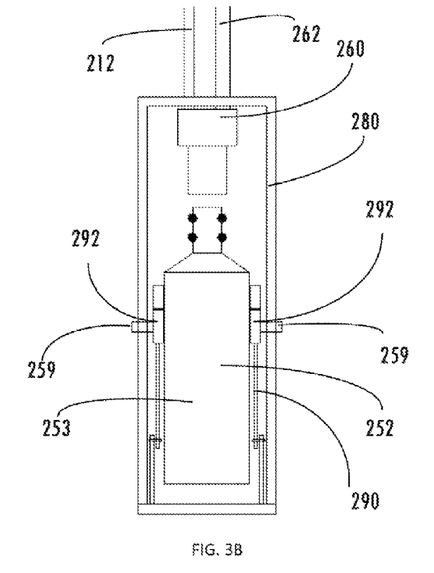
FIG. 3B is a front view of a water filter assembly with a door in the open position for use with the refrigerator shown in FIG. 1 in accordance with certain aspects of the present disclosure.
Figure 3C:
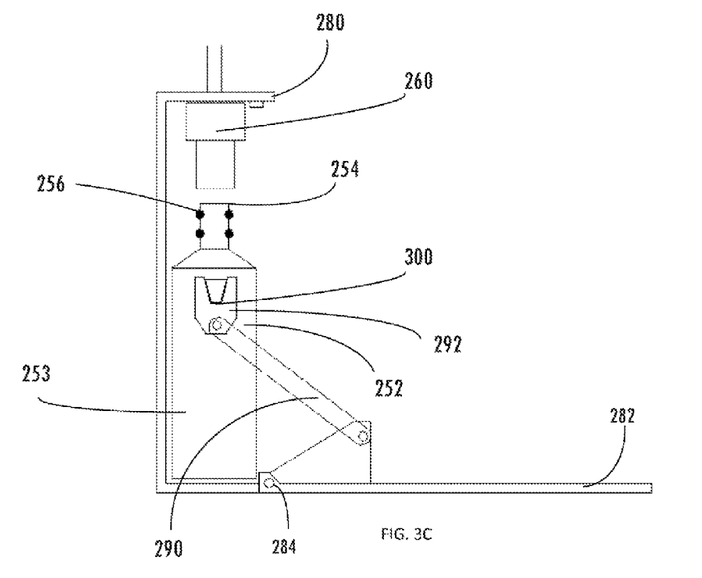
FIG. 3C is a side view of a water filter assembly with a door in the open position for use with the refrigerator shown in FIG. 1 in accordance with certain aspects of the present disclosure.
Figure 4A:
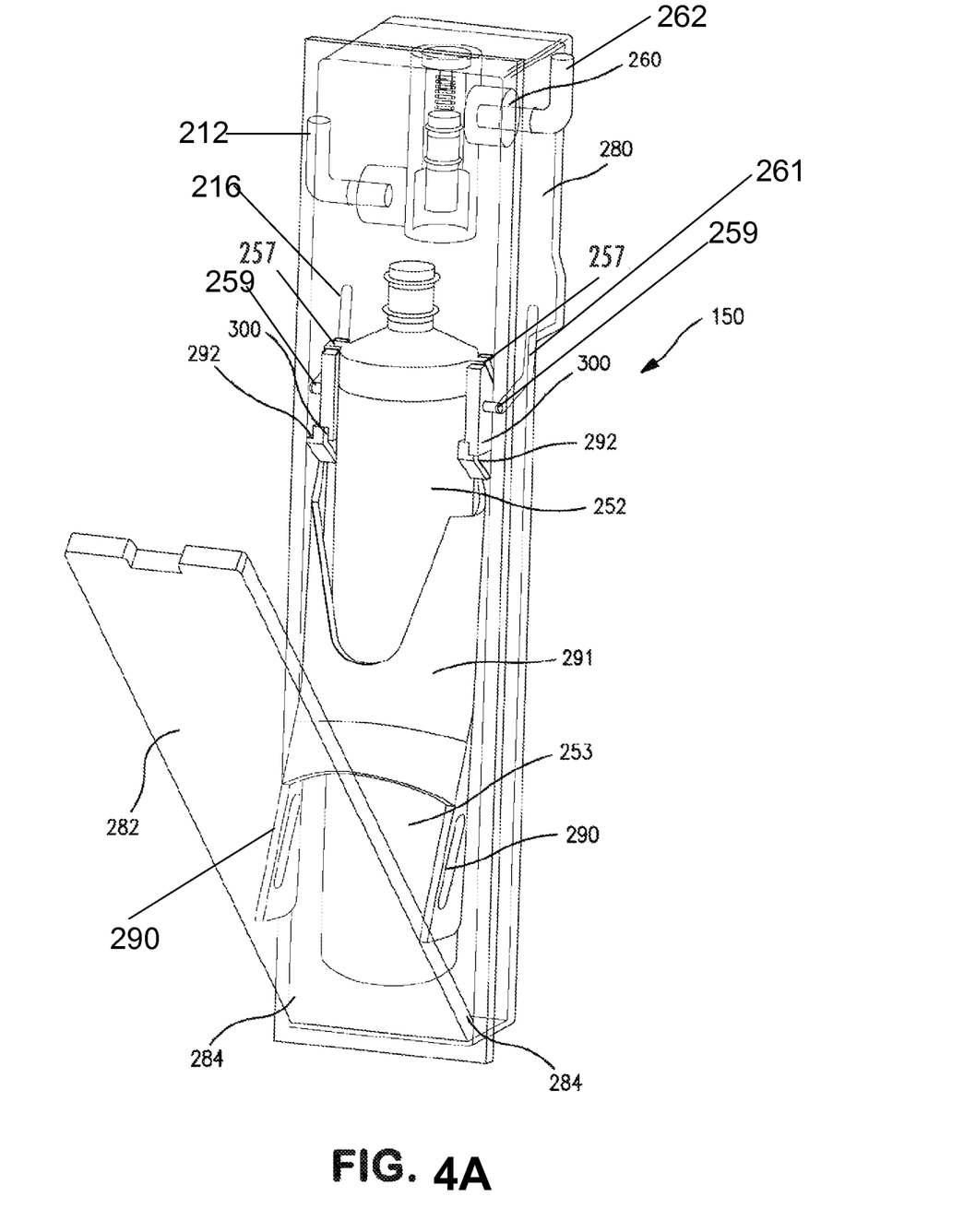
FIG. 4A is a perspective view of a water filter assembly with a door in the open position for use with the refrigerator shown in FIG. 1 in accordance with certain aspects of the present disclosure.

FIG. 3C is a side view and FIG. 4A is a perspective view of exemplary water filter assemblies 150 suitable for incorporation into refrigerator 100 as shown in FIG. 1. Water tank (not shown) can be positioned within refrigerator, such as within fresh food compartment 102 (shown in FIG. 1). Water tank is configured to store and/or cool water received from an external water source. Further, water tank is in fluid communication with filter assembly 150.

In one embodiment, refrigerator 100 includes a filter assembly 150 mounted within door flange (as illustrated in FIG. 1). In particular, one or more parts of filter assembly, such as parts disposed in or on housing 280 (also referred to herein as "body"), may be mounted within door flange while other parts are located in other areas of the refrigerator as would be understood by one of ordinary skill in the art. In alternative embodiments, filter assembly 150 is mounted with respect to any suitable location within or outside of refrigerator 100, including a side wall, mullion, or the like. Filter assembly 150 includes a filter medium 151 (shown in FIGS. 5A, 5B, 6A, and 6B) configured to remove particles from water channeled therethrough. Filter assembly 150 may include any suitable filter medium 151 to address different water quality and/or water capacity concerns of the consumers. In this embodiment, filter assembly 150 is compatible with any suitable filter medium 151 and provides the ability to use interchangeable filter media 151 with the water dispensing system described below.

In this regard, filter media 151 can be positioned within a removable water filter 252. As shown in FIGS. 3A-3C and 4A-4B, removable filter media 252 is positioned within body 280. Body 280 can be of any suitable shape and/or size and can be designed to house removable water filter 252 as well as other components including manifold assembly 260.

Figure 4B:
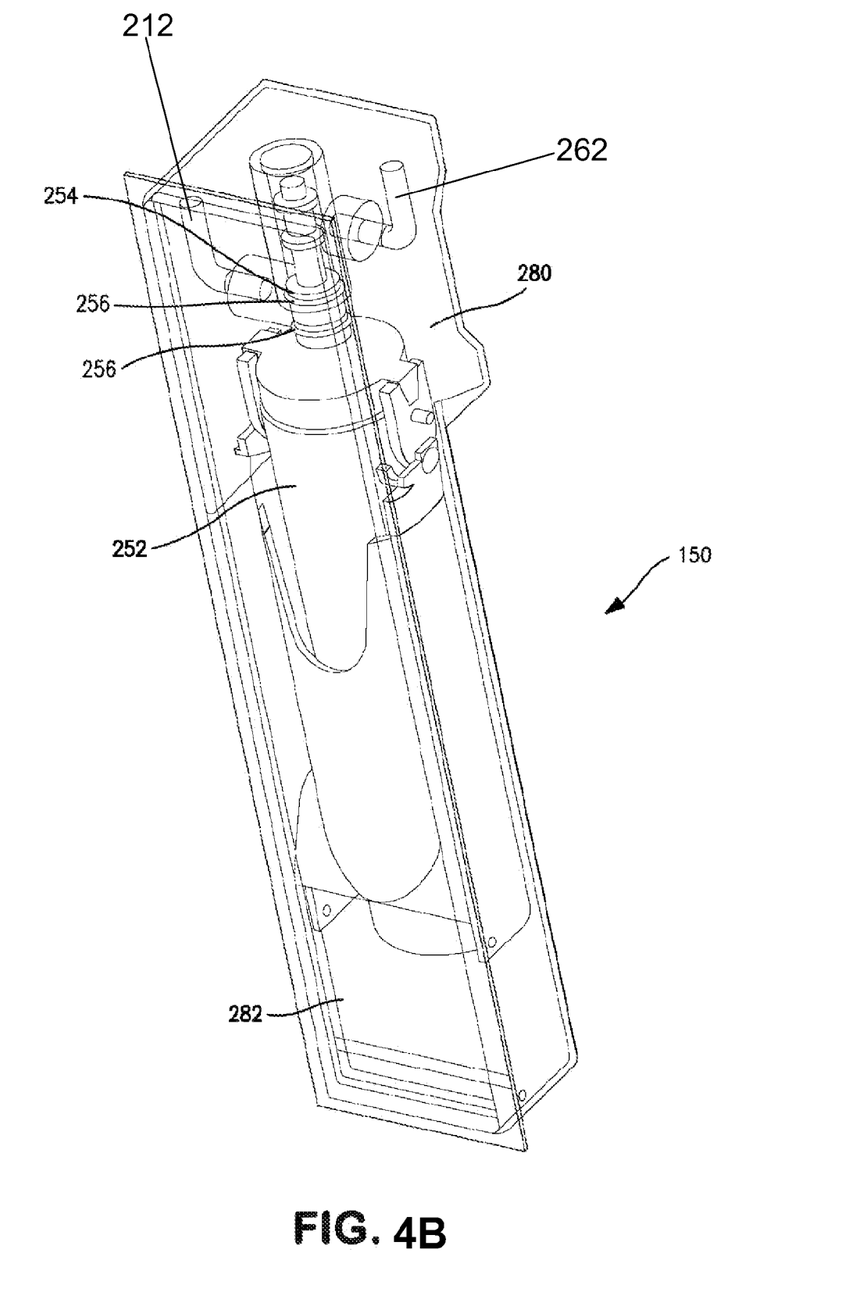
FIG. 4B is a perspective view of a water filter assembly with a door in the closed position for use with the refrigerator shown in FIG. 1 in accordance with certain aspects of the present disclosure.

Body 280 includes door 282. Door 282 is pivotally joined to body 280 and can be open (as shown in FIGS. 3C and 4A) and allow removable water filter to be positioned within body 280 or closed (as shown in FIGS. 3A, 3B, and 4B) whereby removable water filter 252 is enclosed in body 280. It should be understood that as used herein, the term "door" can include any suitable rotatably moving closing mechanism that may or may not completely enclose removable water filter 252 in body 280 when in the closed position. Door can include a handle (not shown) to allow a user to move door between an open position and a closed position and one or more hinges 284 for this purpose. In addition, door 282 can include an interference latch (not shown) or any other suitable device to hold door in a closed position. Door 282 can be formed from any suitable material and can be transparent or semi-transparent such that removable water filter 252 is visible therethrough when door is in the closed position. For instance, in certain embodiments, door can include a window (not shown) to allow viewing of removable water filter 252.

Door 282 is joined to one or more lifter elements 290 that lift removable water filter 252 into engagement with manifold assembly 260 when door 282 is in a closed position (shown in FIGS. 3A, 313, and 4B). When door 282 is in an open position (shown in FIGS. 3C and 4A), lifter elements 290 allow removable water filter to separate from manifold assembly 260 and be removed from body 280. Lifter elements can define a surface 291 (depicted in the exemplary embodiment illustrated in FIGS. 4A and 4B) that can surround a portion of removable water filter to stabilize the removable water filter during engagement and disengagement from manifold assembly.

Lifter elements 290 are pivotally joined to door 282. Lifter elements 290 can include one or more arms 292 which can include one or more portions 300 which complimentarily interface with one or more lugs 257 as will be described in more detail herein. Arms 292 can be pivotally joined to lifter elements 290. Arms 200 292 can further include one or more posts 259 that interface with one or more tracks 261 on body 280 (shown in FIG. 4A). Tracks 261 can guide posts 259 along a predetermined path to prevent removable water filter from contacting the walls of body or from not being properly seated with manifold assembly. In this manner, when door 282 is open, lifter elements 290 can pivot downward and lower removable water filter 252 away from manifold assembly. In certain embodiments, portions 300 can also be utilized to pull removable water filter away from manifold assembly 260 when door 282 is opened. In such embodiments, a pressure locking mechanism of any other suitable mechanism can be utilized. In other embodiments, portions 300 do not pull the removable water filter but the movement downward of portions 300 in combination with the weight of removable water filter is sufficient to disengage removable water filter from manifold assembly. When door 282 is closed, arms can pivot upward and raise removable water filter 252 into engagement with manifold assembly. However, it should be appreciated that although the illustrated embodiments depict a vertical configuration for body 280 and removable water filter 252, horizontal or angled orientations are also contemplated by the present disclosure depending upon the desired location of filter assembly. Vertical orientation can be advantageous because air is easily purged from removable water filter 252.

Removable water filter 252 is mounted in body 280 for filtering water. Removable water filter 252 includes a cylindrical filter housing 253 defining a chamber within which filter medium 151 (shown in FIGS. 5A, 5B, 6A, and 6B) is positioned. Filter medium 151 facilitates filtering water channeled through filter assembly 150. In one embodiment, different types of filter assemblies 150 with different filter medium 151 are interchangeably mounted in body 280. In one embodiment, filter assemblies 150 with different filtering functions and/or characteristics, such as particle filtering, taste and odor removal filtering and/or lead and mercury removal filtering, may be selected by the consumer and mounted in body. In an alternative embodiment, filter assemblies 150 with different filtering capacities, such as total flow until replacement and/or flow rate through filter, are mounted in body 280. As such, different types of filter assemblies 150 may be used to address specific water quality concerns of the consumer.

Removable water filter 252 can be of any suitable shape and/or size. For instance, in certain embodiments, such as the illustrated embodiments, removable water filter 252 can have a generally elongated shape configured for being vertically oriented in body 280. Removable water filter 252 can include a first end 254 that is designed to interface with a manifold assembly 260. First end 254 can include one or more o-rings 256 to assist in sealingly engaging first end to manifold assembly 260 in combination from pressure provided by door 280 and lifter arm(s) 292. It should be appreciated that any other suitable elements that provide for sealing engagement between removable water filter 252 and manifold assembly can also be utilized. First end 254 can define an inlet opening and an outlet opening (not shown) that are positioned at the top and side, respectively, of first end 254 as will be described in more detail herein.

As described above, removable water filter 252 includes one or more projections or lugs 257 that interface with lifter arm(s) 292 and portions 300. However, any suitable mechanism for engagement between water filter and lifter is contemplated. Advantageously, lugs 257 can be keyed to have a geometry which corresponds to the geometry of lifter arm portions so as to provide a proprietary interface which prevents unsupported water filters from being utilized. As illustrated, lugs 257 are spaced approximately 180 degrees apart from one another.

Turning to FIGS. 5A, 5B, 6A, and 6B, first end 254 includes a water inlet 262 and water outlet 258. When door is open (illustrated in FIGS. 6A and 6B), removable water filter is disengaged from manifold assembly 260 so water inlet 262 and water outlet 258 are not in flow communication with manifold assembly. However, when door is closed (illustrated in FIGS. 5A and 5B), removable water filter 252 is engaged with manifold assembly 260 and water inlet 262 is in flow communication with water inlet 262 of manifold assembly 260 and water outlet 258 is in flow communication with water outlet 264 of manifold assembly 260. In this regard, water inlet 262 is in flow communication with an opening 263 defined by the top 261 of first end 254 of removable water filter. Water outlet 258 is in flow communication with an opening 265 defined by the side 267 of first end 254 of removable water filter. Top opening 263 can be positioned above o-rings 256 while side opening 265 is located between o-rings 256.

In one embodiment, manifold assembly 260 is positioned within body 280 and water outlet 264 is coupled in flow communication with water dispensing system 200 (shown in FIG. 2). As shown in FIGS. 3 and 4, manifold assembly 260 includes an inlet line 262 coupled in flow communication with water tank (not shown) and an outlet line 212 coupled in flow communication with dispenser 202, as shown in FIG. 2.

Figure 5A:
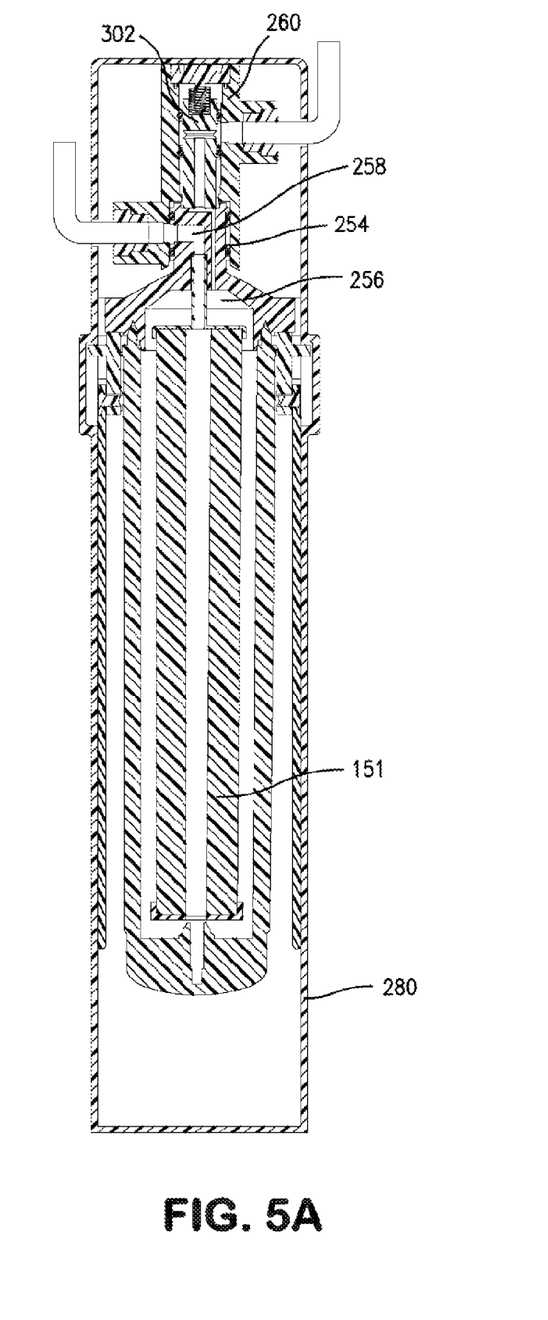
FIG. 5A illustrates a cross section view of the filter assembly of FIG. 4B in accordance with certain aspects of the present disclosure.
Figure 5B:
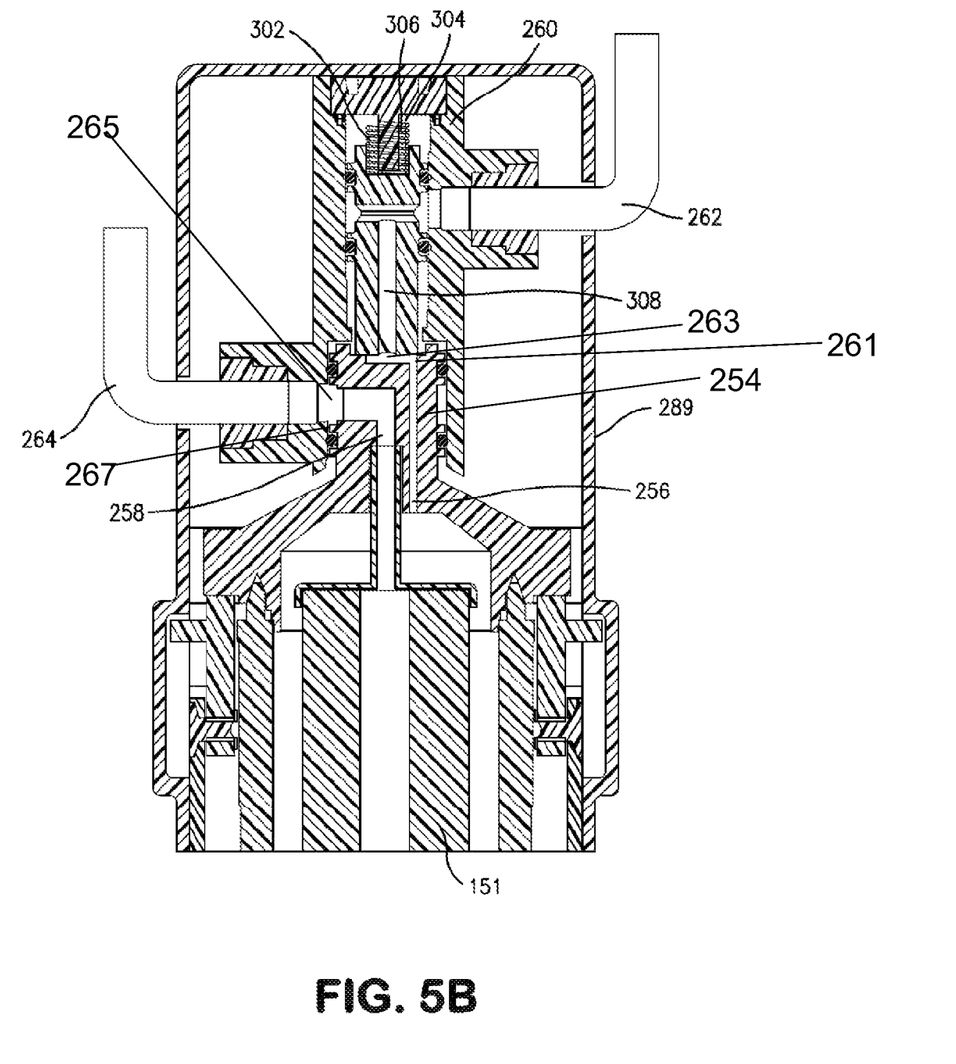
FIG. 5B illustrates an enlarged view of the cross section view of FIG. 5A in accordance with certain aspects of the present disclosure.
Figure 6A:
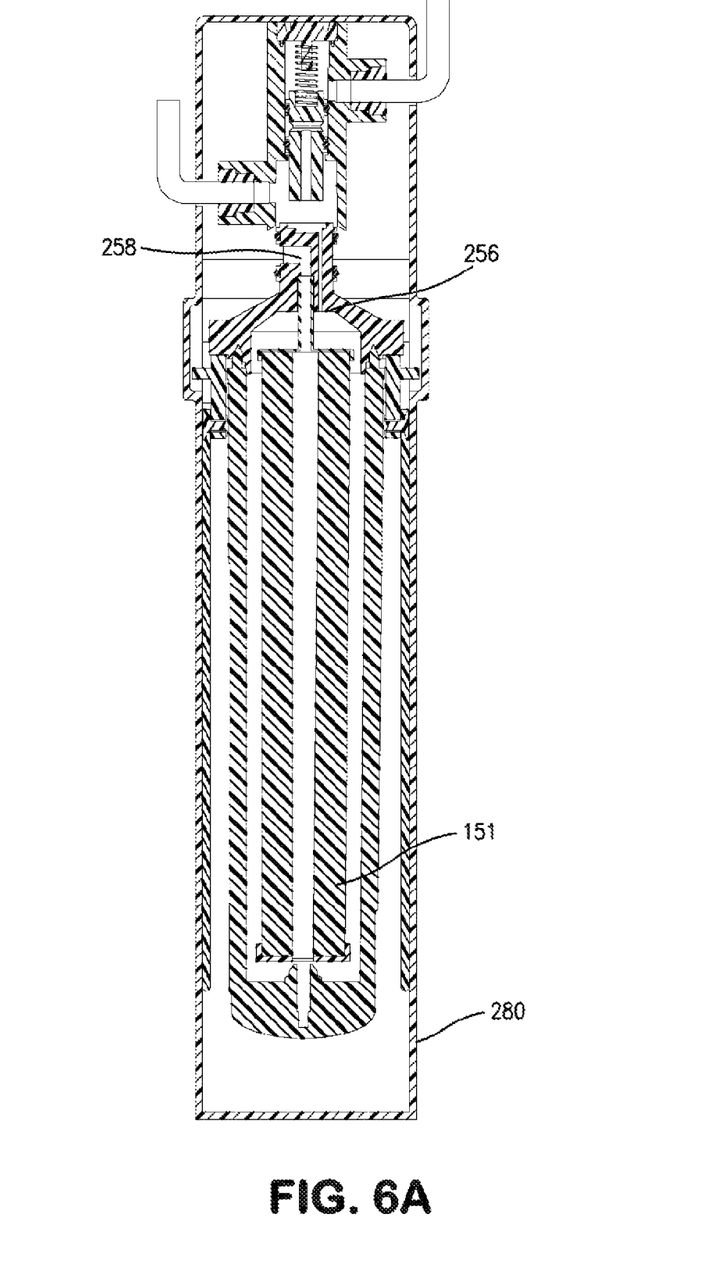
FIG. 6A illustrates a cross section view of the filter assembly of FIG. 4A in accordance with certain aspects of the present disclosure.
Figure 6B:
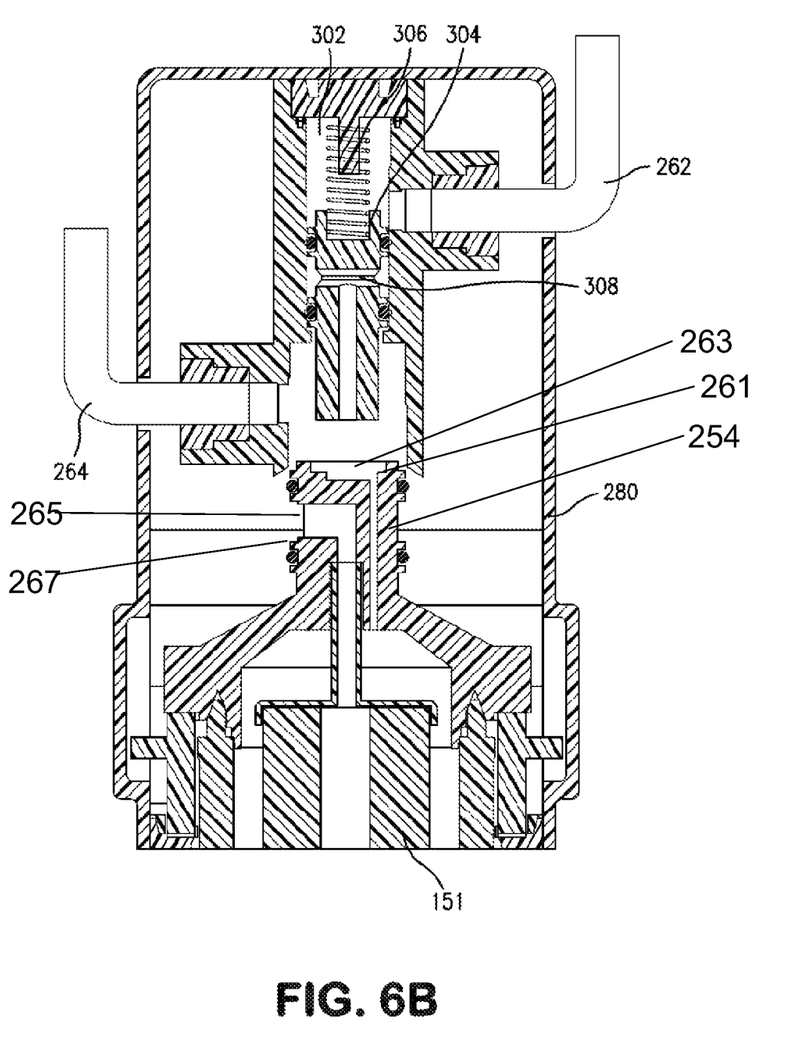
FIG. 6B illustrates an enlarged view of the cross section view of FIG. 6A in accordance with certain aspects of the present disclosure.

Manifold assembly 260 can include a check valve 302 that prevents water inlet from feeding water to removable water filter 252 when door is open and removable water filter is disengaged from manifold assembly 260. Manifold assembly 260 can include a water inlet 262 that flows in part through a section 308 of check valve body 304. Referring to FIG. 6B, check valve 302 can include a spring 306 that moves the section 308 of the flow path defined by check valve body and instead holds check valve body 304 in a position that obstructs water inlet 262. Turning to FIG. 5B, when removable water filter 252 engages manifold assembly 260, check valve body 304 can be caused to be moved such that the spring 306 is compressed and the section 308 of check valve body 304 is generally aligned with the remainder of the flow path and permits water to flow to removable water filter. For instance, as illustrated, removable water filter 252 contacts check valve body to cause movement of check valve body. However, in other suitable embodiments, removable water filter can actuate one or more other elements to move check valve body 304. Although a spring actuated check valve system is illustrated, it should be understood that any suitable check valve system is contemplated by the present disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A water filter assembly for a refrigerator comprising:
a manifold assembly comprising a water inlet and a water outlet;
a removable water filter comprising a water inlet, a water outlet, a neck element, and one or more lug elements that are located adjacent to and separate from the neck element; and
a housing adapted for receiving the removable water filter, the housing comprising a door, the door being pivotally joined to the housing and being movable between a closed position and an open position, the door comprising a mover element, the mover element comprising:
one or more lifter elements pivotally joined to the door, and
one or more arms pivotally joined to the lifter elements, each arm having a complementary shape to the one or more lugs, the one or more arms adapted for interfacing with the one or more lug elements, respectively, wherein the mover element is thereby adapted for engaging the removable water filter such that as the door moves from the open position to the closed position the mover element holds and lifts the removable water filter upwards until, when the mover element is in the closed position the mover element holds the removable water filter water inlet and water outlet in fluid communication with the water inlet and water outlet, respectively, of the manifold assembly, and as the door moves from the closed position to the open position the mover element holds and lowers the removable water filter until, when the mover element is in the open position the mover element allows for removal of the removable water filter which is not in fluid communication with the manifold assembly.

2. The water filter assembly as in claim 1, wherein the manifold assembly further comprises a spring engaged with a body, the spring holding the body in a first position when the door is in an open position in which the manifold assembly water inlet path is obstructed by the body, the spring being compressed into a second position when the door is in a closed position in which the water inlet path is not obstructed by the body.

3. The water filter assembly as in claim 1, wherein the neck element further comprises a top portion and side portion, the neck element defining a water inlet opening and a water outlet opening.

4. The water filter assembly as in claim 3, wherein the water inlet opening is defined by the top portion of the neck element and the water outlet opening is defined by the side portion of the neck element.

5. The water filter assembly as in claim 1, wherein the door comprises a handle which is adapted for moving the door from the open position to the closed position.

6. The water filter assembly as in claim 1, wherein the removable water filter is visible from outside of the housing when the door is in the closed position.

7. A refrigerator comprising:
a water filter assembly, the water filter assembly comprising:
a manifold assembly comprising a water inlet in flow communication with a water supply line and a water outlet in flow communication with a water dispenser;

a removable water filter comprising a water inlet, a water outlet, a neck element, and one or more lug elements that are located adjacent to and separate from the neck element; and a housing adapted for receiving the removable water filter, the housing comprising a door, the door being pivotally joined to the housing and being movable between a closed position and an open position, the door comprising a mover element, the mover element comprising:

one or more lifter elements pivotally joined to the door, and one or more arms pivotally joined to the lifter elements, each arm having a complementary shape to the one or more lugs, the one or more arms adapted for interfacing with the one or more lug elements, respectively, wherein the mover element is thereby adapted for engaging the removable water filter such that as the door moves from the open position to the closed position the mover element holds and lifts the removable water filter upwards until, when the mover element is in the closed position the mover element holds the removable water filter water inlet and water outlet in fluid communication with the water inlet and water outlet, respectively, of the manifold assembly, and as the door moves from the closed position to the open position the mover element holds and lowers the removable water filter until, when the mover element is in the open position the mover element allows for removal of the removable water filter which is not in fluid communication with the manifold assembly.

8. The refrigerator as in claim 7, wherein the manifold assembly further comprises a spring engaged with a body, the spring holding the body in a first position when the door is in an open position in which the manifold assembly water inlet path is obstructed by the body, the spring being compressed into a second position when the door is in a closed position in which the water inlet path is not obstructed by the body.

9. The refrigerator as in claim 7, wherein the removable water filter further comprises one or more lug elements.

10. The refrigerator as in claim 7, wherein the removable water filter is visible from outside of the housing when the door is in the closed position.

11. The refrigerator as in claim 7, wherein the refrigerator further comprises a door flange and the housing is located in the door flange such that the removable water filter is configured to be positioned vertically in the housing.

12. The refrigerator as in claim 7, wherein the refrigerator further comprises a side wall and the housing is located in the side wall such that the removable water filter is configured to be positioned vertically in the housing.

13. The refrigerator as in claim 7, wherein the refrigerator further comprises a mullion and the housing is located in the mullion such that the removable water filter is configured to be positioned vertically in the housing.

* * * * *